(12) United States Patent  
Otsuka et al.

(10) Patent No.: US 7,551,067 B2  
(45) Date of Patent: Jun. 23, 2009

(54) OBSTACLE DETECTION SYSTEM

(75) Inventors: Yuji Otsuka, Hitachinaka (JP); Shoji Muramatsu, Hitachinaka (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 364 days.

(21) Appl. No.: 11/657,489

(22) Filed: Jan. 25, 2007

(65) Prior Publication Data

US 2007/0206833 A1 Sep. 6, 2007

(30) Foreign Application Priority Data

Mar. 2, 2006 (JP) ............... 2006-055681

(51) Int. Cl.  
*B60Q 1/00* (2006.01)

(52) U.S. Cl. ............ 340/436; 340/937; 340/903; 340/435; 345/7; 345/8; 345/9; 701/208; 701/211

(58) Field of Classification Search ........... 340/436, 340/937, 901, 903, 904, 435, 437; 345/7, 345/8, 9; 701/208, 211

See application file for complete search history.

(56) References Cited

FOREIGN PATENT DOCUMENTS

JP       10-222679 A       8/1998

*Primary Examiner*—Daryl Pope  
(74) *Attorney, Agent, or Firm*—Crowell & Moring LLP

(57) ABSTRACT

An object of the present invention is to detect a three-dimensional object by use of a single-eyed camera with a higher degree of accuracy by eliminating false detection of an obstacle, which is caused by a detection error of a vehicle speed sensor or that of a rudder angle sensor.

A top view of a first image including a road surface image is created. The first image is imaged by a camera mounted to a vehicle. Then, a top view of a second image is created. The second image is imaged at a timing different from the timing when the first image is imaged. The two top views are associated with each other on the basis of a characteristic shape on the road surface. In each overlapped portion of the two top views, an area in which a difference occurs is identified as an obstacle.

14 Claims, 11 Drawing Sheets

801

802

803

OBSTACLE DETECTION SYSTEM

BACKGROUND OF THE INVENTION

The present invention relates to an obstacle detection system for detecting, by use of a camera mounted to a vehicle, an obstacle that hinders the driving of the vehicle.

Heretofore, the stereoscopic vision technology for identifying a three-dimensional object by the principles of triangular surveying on the basis of a parallax error of images obtained from two cameras is known. However, stereoscopic cameras are in general more expensive than single-eyed cameras. For this reason, the technique as disclosed in JP-A-10-222679 is known as a technology for identifying a three-dimensional object by a single-eyed camera.

SUMMARY OF THE INVENTION

According to the above-described prior art, from a currently acquired image, an estimated image in the next image acquisition timing is created by use of the speed and rudder angle of a vehicle which are acquired from a vehicle speed sensor and a rudder angle sensor respectively. Then, by comparing the estimated image with an image that is actually acquired in the next timing, a three-dimensional object is detected.

Therefore, there is a case where if a detection error of the vehicle speed or that of the rudder angle occurs, an error occurs in the estimated image, which may result in the fact a planar pattern is detected as a three-dimensional object. It is to be noted that measured values of the vehicle speed and rudder angle are likely to contain an error due to a change in air pressure of tires, the abrasion of rubber, slips, and the like. In particular, at the time of low-speed driving, for example, during when a vehicle is moved to be stored into a garage, the accuracy of a vehicle wheel speed sensor decreases, and thereby an error will easily occur in a detection value of the vehicle speed.

In order to solve the above-described problem, according to one aspect of the present invention, there is provided an obstacle detection system executing the steps of: creating a top view of a first image including a road surface image, the first image being imaged by a camera mounted to a vehicle; creating a top view of a second image, the second image being imaged at a timing different from the timing in which the first image is imaged; associating the two top views with each other on the basis of a characteristic shape on the road surface; and in each overlapped portion of the two top views, identifying, as an obstacle, an area in which a difference occurs.

It is possible to detect a three-dimensional object by use of a single-eyed camera with a higher degree of accuracy by eliminating false detection of an obstacle, which is caused by a detection error of a vehicle speed sensor or that of a rudder angle sensor.

DETAILED DESCRIPTION OF THE PREFERRED EMBODIMENTS

Embodiments of the present invention will be described with reference to drawings as below. Incidentally, the undermentioned embodiments will be described by taking as an example a case where an obstacle behind a vehicle is detected.

First Embodiment

Figure 2:
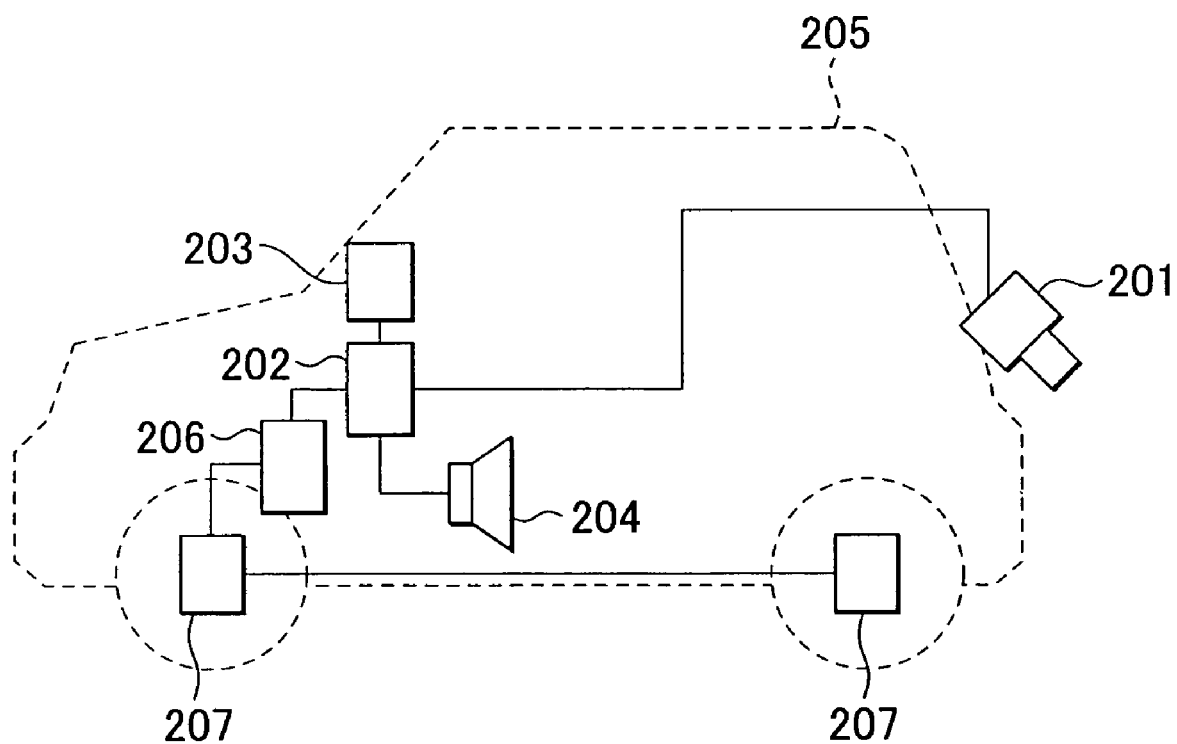
FIG. 2 is a diagram illustrating a configuration of a vehicle according to the embodiment of the present invention.

FIG. 2 is a diagram illustrating a configuration of a vehicle that is equipped with an obstacle detection system. A camera 201 is mounted to the rear of the vehicle 205. This camera 201 is located with such a depression angle that the optical axis of a lens is oriented in an obliquely downward direction. A video image is taken by this camera 201 as an oblique overhead view. Image data which is imaged by the camera 201 is inputted into a processing unit 202 through a communication line 209. The processing unit 202 identifies an obstacle by means of the undermentioned image processing. The processing unit 202 is connected to an image display unit 203 through a signal line. The processing unit 202 displays various kinds of information about the obstacle, the information including an image imaged by the camera 201, and the positional relationship between the detected obstacle and the host vehicle. In addition, the processing unit 202 is also connected to an audio output unit 204. When an obstacle is detected, the processing unit 202 gives an alarm to a driver by use of a warning sound or a voice message.

The processing unit 202 is connected to a brake control unit (hereinafter referred to as "BCU") 203 through a signal line. When the processing unit 202 detects an obstacle in a path of the vehicle by the image processing and control logic described below, the processing unit 202 outputs an instruction signal to the BCU 203 to generate the braking force. The BCU 203 is connected through a signal line, a power line, or hydraulic piping to each brake 207 that is provided for each wheel of the vehicle. The instruction signal received from the processing unit 202 causes each brake 207 of each wheel to operate.

Next, a configuration of the processing unit 202 will be described with reference to FIG. 3.

The camera 201 includes a lens, an imaging element (CCD), an A/D converter, and a DSP (Digital Signal Processor). Image data (analog signal), which is imaged by the imaging element, is converted into a digital signal by the A/D converter. The digitized image data is subjected to correction such as gamma correction by the DSP. The image data is then output from an output unit of the camera 201. Incidentally, other kinds of imaging elements may also be used. For example, if a CMOS sensor is adopted, a reduction in costs of the camera 201 can be achieved.

The processing unit 202 includes: a video input unit 303 for controlling the input of image data received from the camera 201; a memory 302 for storing image data inputted from the camera, image data that has been subjected to image processing, and a program used for the image processing; a CPU 301 for performing image processing, and processing of detecting an obstacle; a video output unit 304 for controlling a signal that is inputted from the processing unit 202, and that is output to the image display unit 203; an audio output controller 305 for controlling a signal that is inputted from the processing unit 202, and that is output to the audio output unit 204; and a serial I/F 306 for controlling the output of a signal to the BCU 206. These elements can be mutually communicated through a bus 310.

The video input unit 303 stores image data received from the camera 201 in an image area of the memory 302 in synchronization with the communication timing of the bus 310. The memory 302 includes at least: an image area for storing image data; and a program variable area for storing program variables that are used for the operation of the CPU 301. Among the areas, the image area is provided with a transmission area for storing an image to be output to the image display unit 203 by the video output unit 304. When the result of image processing is displayed, the processing unit 202 stores, in the transmission area, image data that has been subjected to the image processing. When no particular image processing is performed, the obtained image data can also be displayed in the image display unit 203 just as it is by directly storing the image data inputted from the camera 201 in the transmission area of the memory 302.

Figure 1:
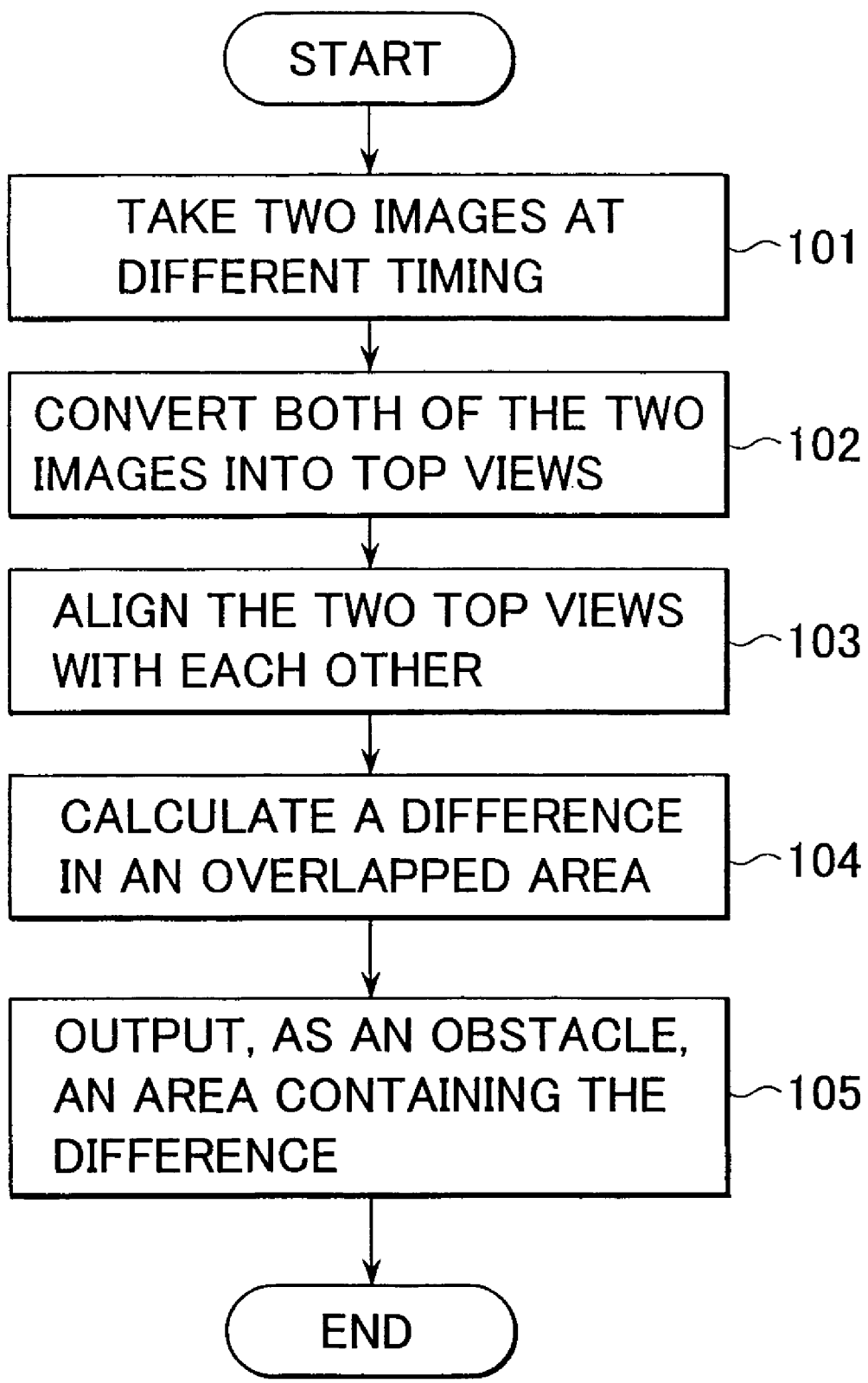
FIG. 1 is a flowchart illustrating the process flow according to an embodiment of the present invention.
Figure 4A:
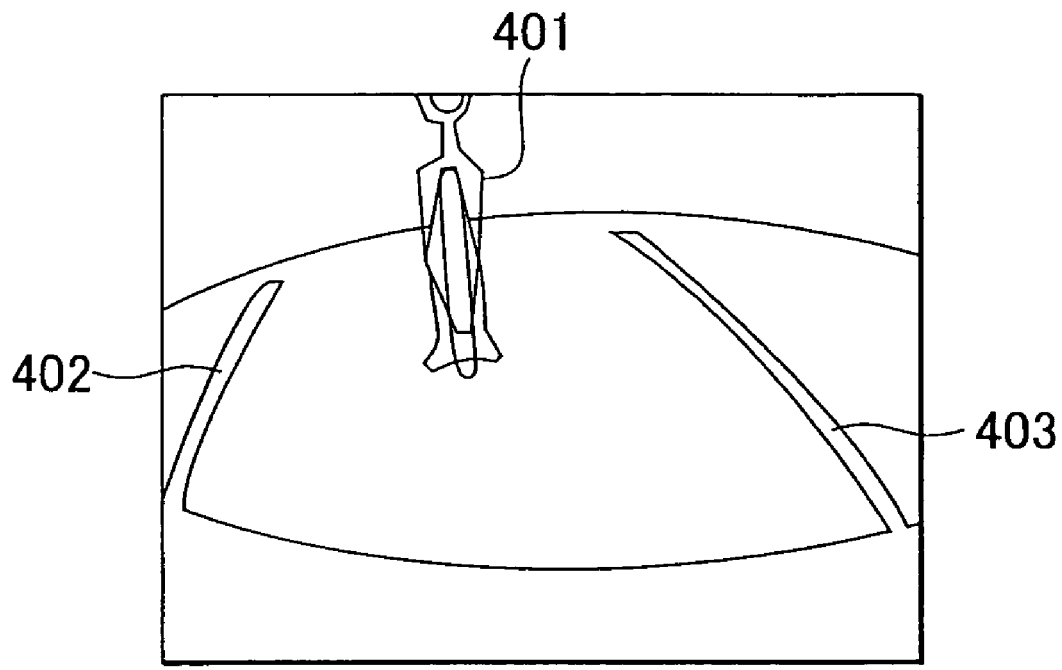
FIGS. 4A, 4B are oblique overhead views, each of which is acquired by a camera.
Figure 4B:
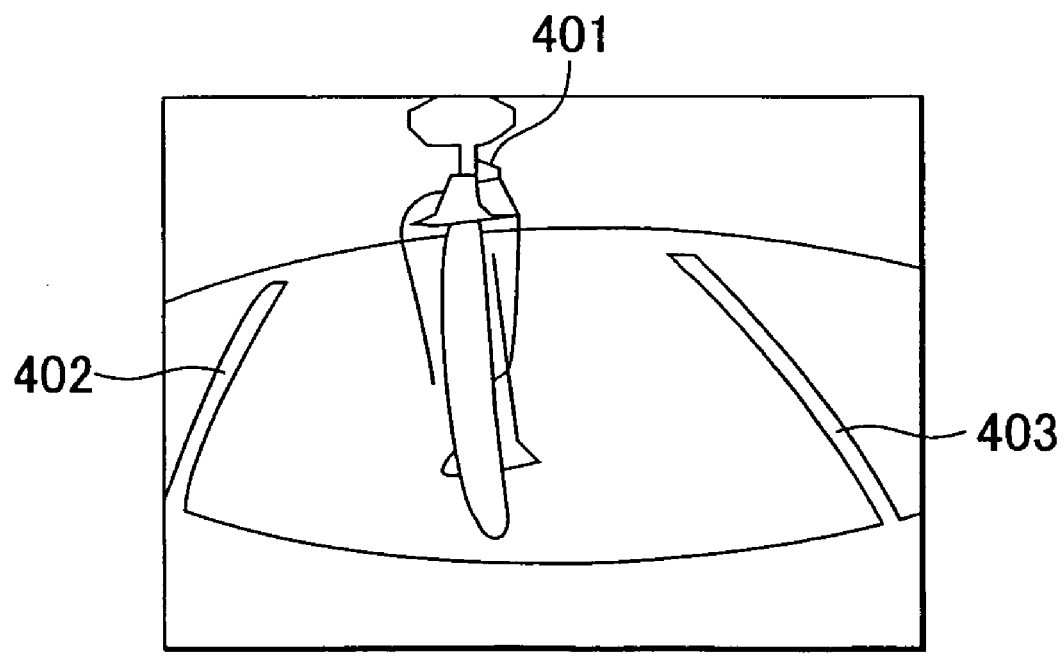

Next, an embodiment of how to detect an obstacle will be described with reference to FIG. 1, and FIGS. 4A, 4B through FIG. 7. FIG. 1 is a diagram illustrating an example of the process flow in which an obstacle is detected from an image taken by the camera 201. FIG. 4 is a diagram illustrating an image that is taken by the camera 201 when there is an obstacle 401 such as a bicycle in a backward parking space.

First of all, in a step 101, two images are acquired at different timings. Therefore, when a vehicle is moving, two images are imaged at positions that differ from each other. For example, when the vehicle backs up so that the vehicle is parked in the backward parking space, if there is the obstacle 401 such as a bicycle in the parking space, two images as shown in FIGS. 4A, 4B are obtained. To be more specific, FIG. 4A illustrates an image that is obtained by imaging the rear of the vehicle by the camera 201 in a certain timing; and FIG. 4B illustrates another image that is obtained thereafter by imaging the vehicle in the next timing while the vehicle 205 continuously backs up to near the obstacle 401. As described above, the above images are received from the camera 201 through the video input unit 303, and are then stored in the memory 302.

Next, the oblique overhead view which has been acquired in the step 102 is subjected to projective transformation so that the oblique overhead view is transformed into a top view. The projective transformation is an arithmetic operation by which a figure of an object, which is viewed from a certain direction, is transformed into a figure viewed from another direction. Here, the top view is distortionless video when viewed down from a position directly above the road surface along an optical axis perpendicular to the road surface. In general, the transformation from the oblique overhead view to the top view can be achieved by the projective transformation.

In a step 103, the two images, which are transformed into the top views, are subjected to positional alignment with reference to a landmark (a design, a mark, a symbol, a difference in level such as a curb) on the road surface that is imaged in common. In this embodiment, the projective transformation is performed on the assumption that the image data, which has been imaged by the camera 201, is a planar design that is entirely drawn on the road surface. Accordingly, in actuality, even if an imaging position changes as a result of the move of the vehicle, a shape of the planar landmark on the road surface in each of the images before and after the move does not change after the projective transformation. To be more specific, an image in which a position of the vehicle is displaced by the moved distance of the vehicle on the same map will be acquired. On the other hand, in actuality, a three-dimensional object is not a design on the road surface. Therefore, if the projective transformation as described above is performed, the three-dimensional object is expressed as a figure which is different from a shape of a three-dimensional object that actually exists there. An image of the three-dimensional object changes in response to a change in distance between the vehicle and the three-dimensional object, which is caused by the move of the vehicle. Therefore, if a plurality of images, which have been imaged at different timings during the move of the vehicle, are subjected to the projective transformation so that the images are compared with one another, portions which do not include the three-dimensional object (landmarks in the road surface) agree with one another, whereas portions including the three-dimensional object differ from one another. Therefore, it is possible to detect the three-dimensional object.

Therefore, in order to correctly detect a three-dimensional object, it is necessary to correctly image a landmark such as a design on the road surface, and to accurately compare a plurality of images with one another. Although it is necessary to correctly image the landmark on the road surface, there is a case where the landmark cannot be correctly imaged due to the influence of the lens distortion.

Here, a wide-angle lens whose angle of view is about 120 degrees is often used as the camera 201 so that the backward safety is ensured. Accordingly, as shown in FIG. 8B, an image which is acquired by the lens includes the barrel-shaped lens distortion. As indicated with white lines 402, 403 in FIGS. 4A, 4B, because of the barrel-shaped lens distortion, each line which should be actually a straight line appears to be a curve that is curved outward. Therefore, in order to correctly image the landmark on the road surface, it is necessary to eliminate the lens distortion by means of calibration.

Figure 8A:
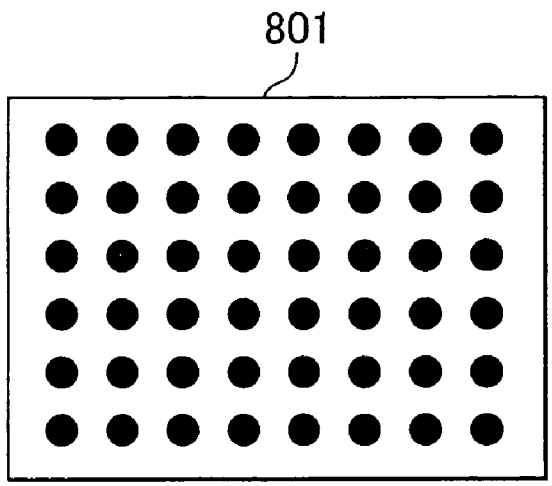
FIGS. 8A, 8B, 8C are diagrams each illustrating a calibration plate.
Figure 8B:
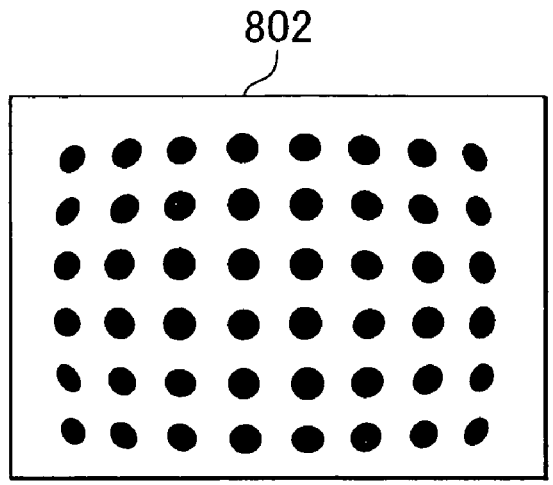
Figure 8C:
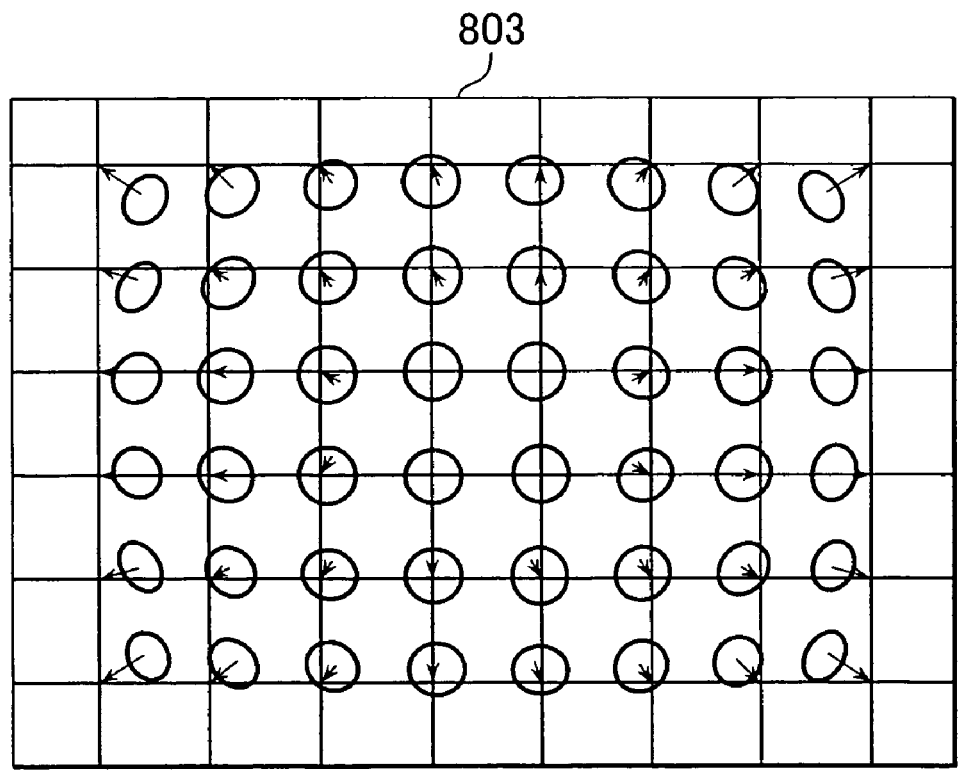

The calibration is performed by use of a calibration plate 801 shown in FIG. 8A. Black dots are regularly drawn at specified intervals in a lattice-shaped pattern on the calibration plate 801. After this calibration plate 801 is placed so that the calibration plate 801 is kept in parallel with an imaging surface of the camera 201, if the calibration plate 801 is imaged there, the lens distortion causes each of the black dots on the calibration plate 801 to be deflected from a position at which each of the black dots should be actually located. A black dot which is closer to the perimeter of the image is more deflected inward. The lens distortion can be determined by calculating the amount of deflection in image processing. FIG. 8C is a diagram schematically illustrating the principles of the calibration. Each position of a black dot on the calibration plate shown in FIG. 8A corresponds to each lattice point shown in FIG. 8C. Thus, the image is corrected so that each black dot on the image in which the barrel-shaped distortion is included is adjusted to each corresponding lattice point.

The amount of correction is measured beforehand, and is stored in the memory 203 of the processing unit 202.

Figure 5A:
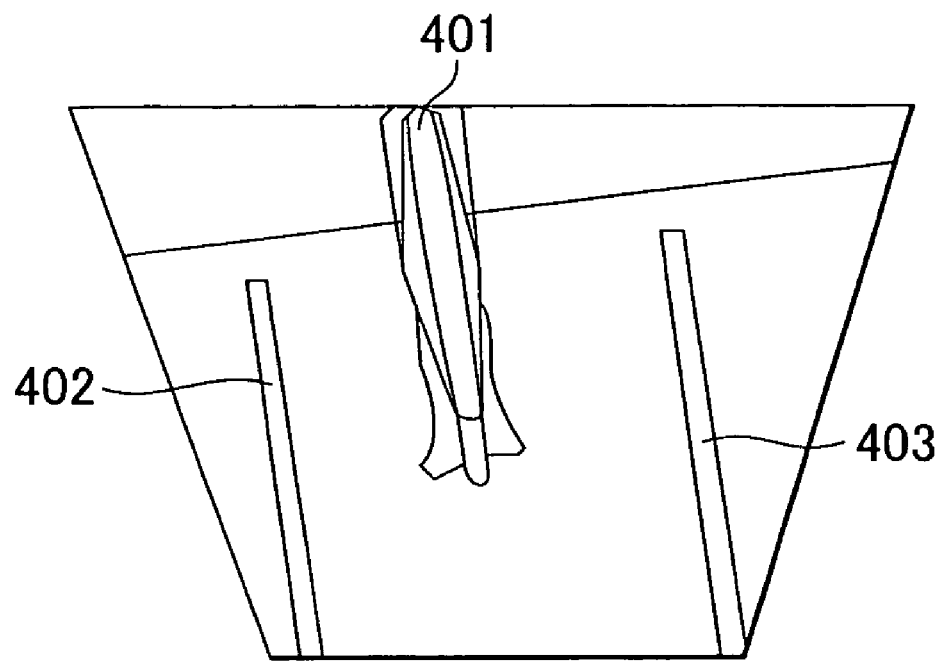
FIGS. 5A, 5B are top views, each of which is generated by lens distortion correction and projective transformation.
Figure 5B:
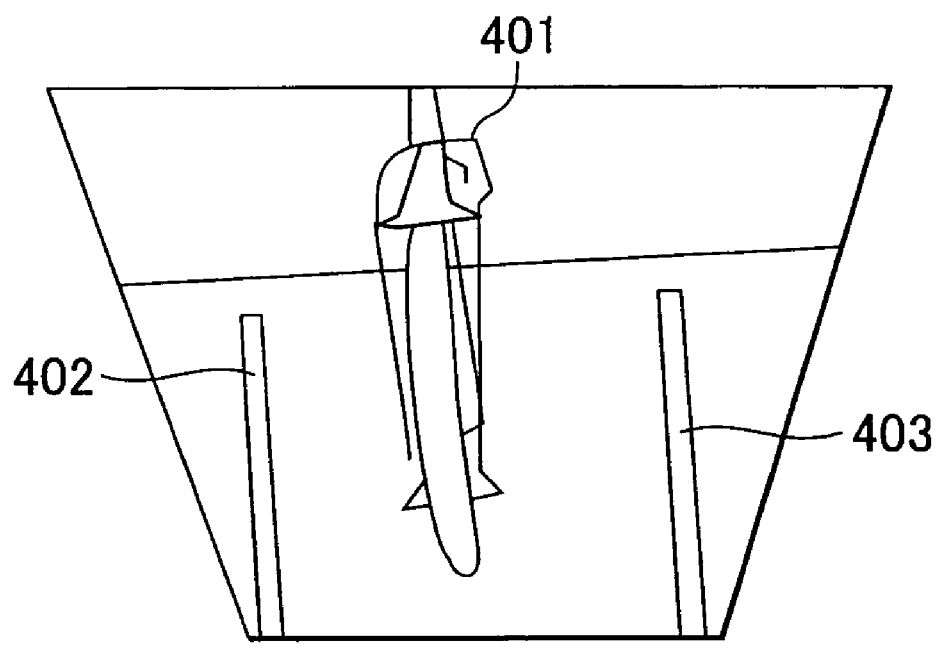

As a result of the lens-distortion correction processing and the projective transformation, the oblique overhead views shown in FIGS. 4A, 4B are transformed into the top views shown in FIGS. 5A, 5B respectively. The above processing is performed as follows: reading out the image stored in the memory 302 to execute the processing of the image by the CPU 301; and then storing the image in the memory 302 again.

Figure 6:
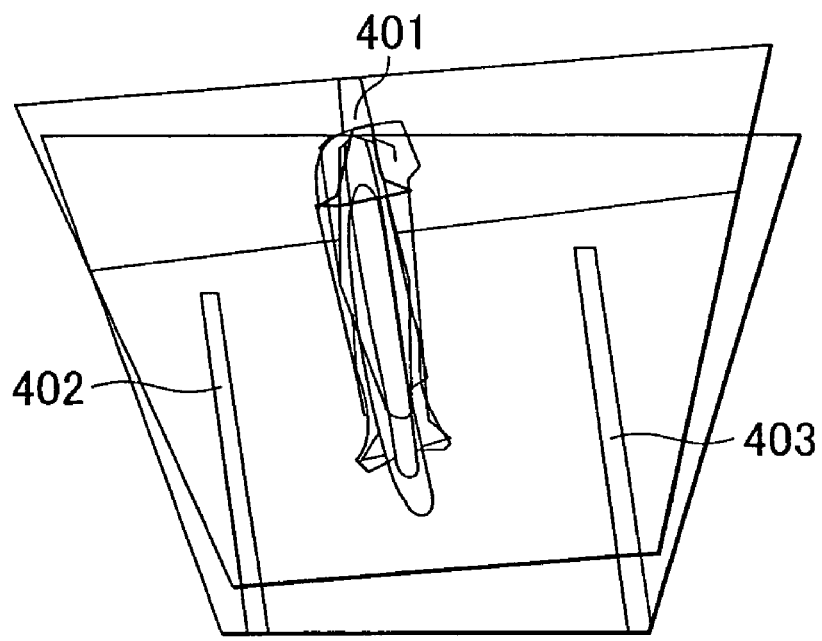
FIG. 6 is a diagram in which images are aligned with each other and are then superimposed on each other with the amount of deviation caused by the move of the vehicle being taken into consideration.

In a step 104, a difference is calculated by determining the amount of the move from the landmark by use of FIGS. 5A, 5B that are two top views, each of which shows backward driving. However, because the vehicle moves during a period of time between the first imaging and the second imaging, an imaging position of the first image is deviated from that of the second image. For this reason, in a step 103, for example, the two images are aligned with each other to associate each position of the first image with each position of the second image with reference to the white lines 402, 403 as shown in FIG. 6, and then a difference in each overlapped portion is extracted. It is to be noted that the white lines are detected by means of the Hough transform in this embodiment. The Hough transform is a general technique for detecting a straight line.

In this embodiment, the two images are aligned with each other using the white lines 402, 403. However, even if the white lines 402, 403 are detected by means of the Hough transform, there is a case where the positional alignment cannot be correctly achieved because the white lines 402, 403 parallel each other. It is because in order to associate two planar images with each other, it is necessary to align positions of the planar images with each other vertically and horizontally, and also to align the rotation of the planar images with each other, which requires at least three reference points. When only two parallel white lines are used, if the two images are slide along the white lines to a degree, positions of the white lines agree with each other. Accordingly, there is a case where each position of one image cannot be associated with each corresponding position of the other image.

For this reason, in addition to the two white lines, a straight line or a point on the road surface, which are not in parallel with the two white lines, is detected. The detected straight line or point is used as the reference. In the case of FIGS. 5A, 5B in this embodiment, the edge detection is carried out along a detected straight line to find out the end of the white line. This end is used as the reference. In another case, a line 411 is used as the reference. The line 411 exists over the white lines 402, 403, and does not parallel the white lines 402, 403. Moreover, a car stop block which is placed in a parking space may also be used as the reference.

In addition, the above description is based on the assumptions that the two images are transformed into the top views each illustrating a view from the same height, and that the distance between the two white lines is adjusted with the same scale in each top view. However, unless the camera 201 has a zoom function, or the like, an obstacle, a white line, and the like are imaged with the larger scale in raw image data, which is imaged by the imaging element, as the vehicle gets nearer to them. Therefore, processing of unifying the scale of a plurality of images, each of which is a target to be compared, is required. In other words, it is necessary to transform the images into figures viewed from the same position having the same height with the relationship with the host vehicle being taken into consideration; that is to say, for example, "a figure viewed from a position, which is 2 m backward from the host vehicle, and whose height is 1 m". Scale unification processing of images will be described as below.

First of all, a mounting position and a mounting angle, at which the camera 201 is mounted to the vehicle, are kept constant unless the camera 201 is shocked or unless a mounted portion is loosened. Usually, the camera 201 does not have a zoom function and an oscillation function. Therefore, each of images, which are imaged by the imaging element constituted of pixels, always becomes an image that is taken at a position having the constant distance and the constant direction angle with respect to the host vehicle. Accordingly, it is possible to define, on a pixel basis, the angle and the scale (magnification) for the projective transformation used to transform each image into a top view that views from the above-described specific point.

For this reason, the angle and scale for the projective transformation are calculated on a pixel basis, and are then stored in the processing unit 202 as a lookup table. As a result, even if each image acquired at different times is subjected to the projective transformation, a top view which views from the same height (the scale) is always acquired. This enables the positional alignment by use of the landmark described above.

Figure 7:
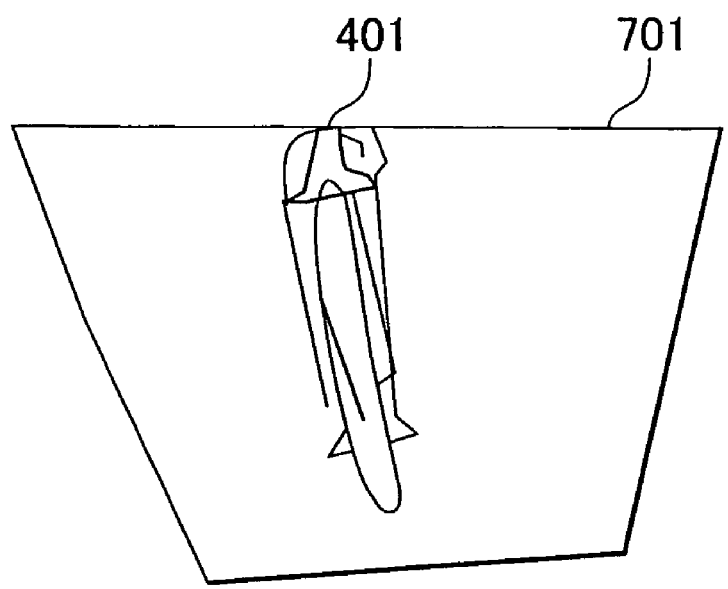
FIG. 7 is a diagram that is generated by extracting a difference in brightness shown in FIG. 6.

As described above, in the top view that is transformed in the step 102, the size and shape of an object having no height, such as a feature printed on the road surface and a road surface pattern, do not change even if the position and angle of the vehicle 205 change as a result of the move of the vehicle 205. In contrast with this, for a three-dimensional object having some height from the read surface (for example, the obstacle 401), if the vehicle 205 moves, a shape appears to change in FIG. 4 that is the oblique overhead view before the transformation. Accordingly, as shown in FIG. 5, the change in shape is left just as it is even if the transformation into the top view is carried out. In this embodiment, a three-dimensional object is detected with attention being paid to this point. To be more specific, two images are aligned with each other before the difference in brightness in each overlapped portion is extracted. If the difference in brightness is extracted, the white lines 402, 403, and other features, disappear as shown in FIG. 7 because they agree with each other between the two images. In this case, the difference in brightness appears only in a portion of the three-dimensional object 401 having a different shape.

In a step 105, an area having the difference in brightness is judged to be a three-dimensional object (obstacle). Incidentally, there is a possibility that the two top views will contain some errors caused by image processing such as the projective transformation and the elimination of the barrel-shaped distortion. Therefore, instead of judging that all areas, each of which includes the difference in brightness, are three-dimensional objects, it may also be judged that an area in which a value of the difference in brightness is a specified threshold value or more is a three-dimensional object.

In the step 105, an area in which the difference in brightness occurs as a result of the calculation of the difference is output as a three-dimensional object. As an output method, the result of detecting an obstacle is displayed on a screen of the navigation monitor 203 in a superimposed manner, or sound is output to the speaker 204. A position at which the superimposition is carried out corresponds to an area that is the closest to the vehicle 205 among areas in which the difference in brightness occurs as a result of the calculation of the difference. Here, if a landmark is not found in the step 103, the positional alignment cannot be performed, which makes it impossible to detect an obstacle. Therefore, a driver is notified of this information by use of the monitor 203 or the speaker 204. In another case, a dedicated indicator is provided. The dedicated indicator is used to display information notifying that the processing unit 202 cannot detect a landmark. If the above processing is described with reference to the process flow shown in FIG. 3, an obstacle which has been detected in the step 103 is superimposed on an image stored in the memory 302 (processed in a superimposed manner). Then, the superimposed image is output from the video output unit 304 so as to display the superimposed image on the monitor 203. The output image may be a video image that is the same as the image taken by the camera as shown in FIG. 4; or the output image may also be the top view into which the image taken by the camera has been transformed as shown in FIG. 5. In addition, when the obstacle is getting nearer, an alarm is issued from the audio output controller 305 through the speaker 204 if necessary, or the brake 207 is controlled from the brake control unit 206 through the serial interface 306 so as to reduce the speed.

Thus, according to this embodiment, it is so configured that if there is an object that can be obviously identified as a pattern on the road surface (for example, the white lines 402, 403), positions of two images are aligned with each other with reference to the object. This makes it possible to provide a configuration in which when the difference is calculated, the difference in brightness rarely occur in an area including a feature such as a road surface pattern. As a result, it is possible to prevent a road surface pattern from being identified as an obstacle by mistake.

Thus, if the difference in brightness value is calculated, the difference in brightness occurs due to a parallax error of a three-dimensional object. However, in addition to it, the difference in brightness also appears in a moving object, for example, a walking person, a small animal such as a dog or a cat. This is because the time difference occurs if two images are imaged during the move. A position and a shape will deviate by the amount of the move for that period of time. In other words, according to this embodiment, it is possible to detect not only a standstill three-dimensional object but also a moving three-dimensional object as an obstacle.

Incidentally, if a landmark cannot be detected in a certain imaging timing, even if an image is acquired in the next imaging timing, it is not possible to detect an obstacle because there is no image that is a target to be compared. For this reason, image data which has been acquired in the past, once or several times, is stored in the storing means (memory) 302 of the processing unit 202. If a landmark cannot be detected in the certain imaging timing, image data, which has been acquired last time or before the last time, is stored. Then, an obstacle is detected by comparing the stored image with an image that is acquired in the next imaging timing.

When an obstacle is detected by the configuration of this embodiment, with the result that a driver is warned against the obstacle, the driver is expected to operate a brake so that a vehicle is stopped. However, if the vehicle stops, a plurality of images acquired at different times become those imaged at the same position. As a result, the difference in brightness does not occur, and accordingly it becomes impossible to identify an obstacle.

Therefore, in the configuration of this embodiment, when the vehicle speed decreases to such an extent that an obstacle cannot be identified, an indication is given through the monitor 203, the speaker 204, or the dedicated indicator, or the braking force is controlled, on the basis of the position and shape of the last identified obstacle.

Incidentally, if the driver gets off the vehicle to move the obstacle and then starts the driving again, it is necessary to restart the driving with an alarm being kept given according to the above-described configuration. Therefore, this method is improper. For this reason, it is so configured that a switch for checking driver's intention to restart driving is provided. If a signal is inputted from this switch, the detection of an obstacle is temporarily reset. This configuration makes it possible to restart the driving in a state in which an obstacle is not detected. Incidentally, even if the driver restarts driving without moving the obstacle by pressing the above-described switch, the obstacle is identified again as a result of imaging several times at the latest, and consequently an alarm is given and the braking force is controlled. Therefore, no influence is exerted on the security.

Second Embodiment

Up to this point, the embodiment which uses white lines was described as a method for associating two images with each other. In the case of an outdoor parking space or a multistory parking space, white lines are drawn on the road surface in many cases. Accordingly, it is possible to associate images with each other by using each of the white lines as a landmark. However, in the case of a home garage where only one car is parked, in many cases white lines are not drawn on the road surface. In such a case, it is necessary to find out a landmark other than the white line. An embodiment in which no white line is drawn will be described as below.

Figure 3:
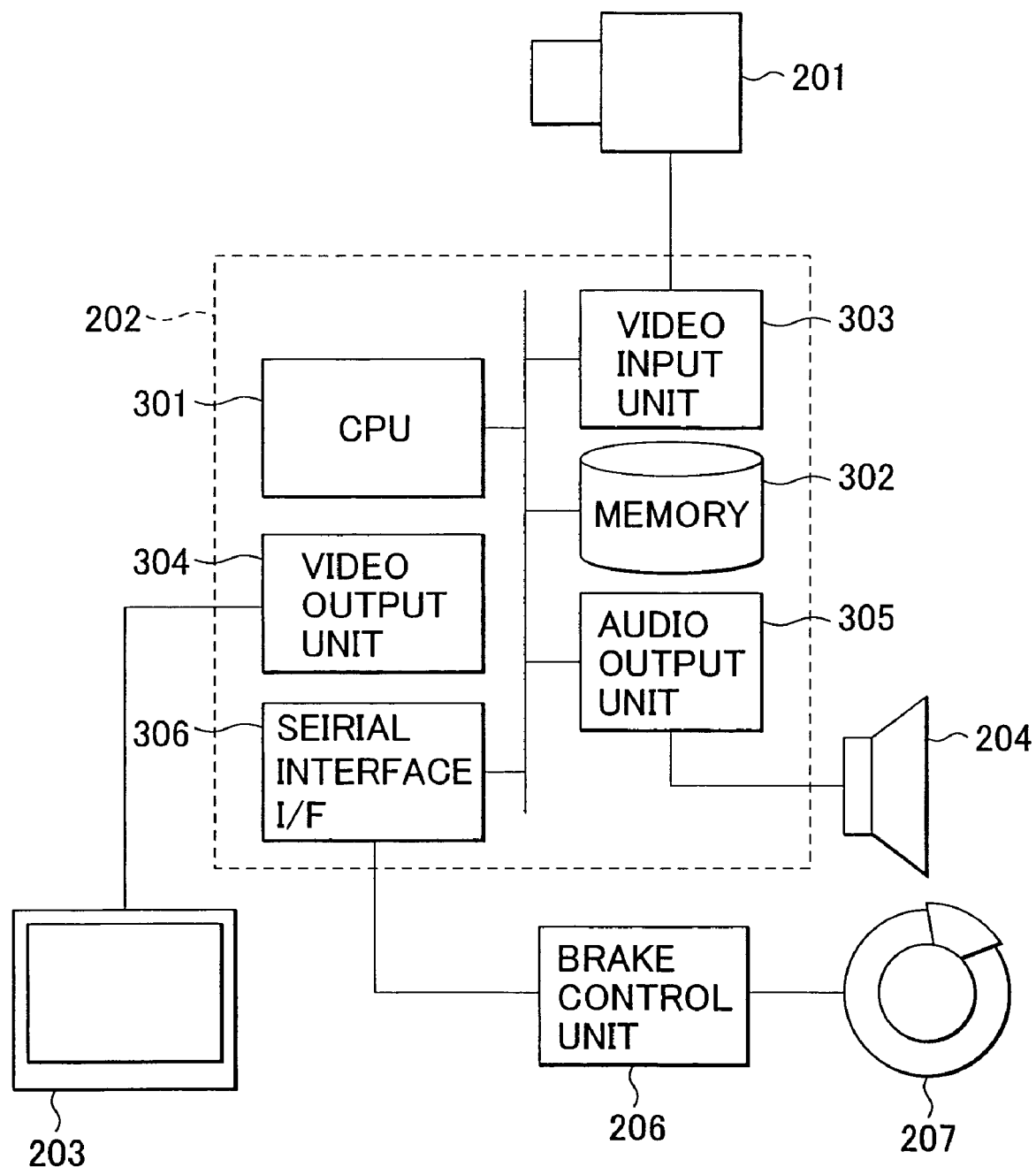
FIG. 3 is a diagram illustrating a configuration of a processing unit according to the embodiment of the present invention.

Incidentally, a configuration of the vehicle 205 and that of the processing unit 202 in this embodiment are the same as those illustrated in FIGS. 2, 3. In addition, the process flow in this embodiment is also the same as that illustrated in FIG. 1 except processing of associating each position of one image with each corresponding position of the other image.

In the case of a garage whose road surface is surrounded by walls, or the like, it is possible to define the road surface by use of lines, each of which is formed by the road surface and each wall, even if there is no white line. Therefore, a closed area of the road surface surrounded by the lines (more specifically, a shape of a profile of the road surface) is defined, and the shape is used as a template. Accordingly, it is possible to align images with each other by performing pattern matching such as generalized Hough transform using the template. Here, the closed area can be calculated by use of the seed fill algorithm that is a general paint routine.

In addition, if the closed area is filled with some pattern, it is possible to align images with each other even if pattern matching by a shape of the closed area in question is adopted. This processing will be described with reference to FIGS. 9A, 9B through FIGS. 11A, 11B as below.

First of all, two images are imaged at different timings. When a vehicle is driven into a garage whose road surface is surrounded by walls, or the like, two images which are imaged by the camera 201 become those shown in FIGS. 9A, 9B. These correspond to FIGS. 4A, 4B in the first embodiment. Incidentally, reference numeral 1001 denotes the road surface; reference numerals 1002, 1003 denote right and left wall surfaces; and reference numeral 1004 denotes the end of the wall.

Figure 9A:
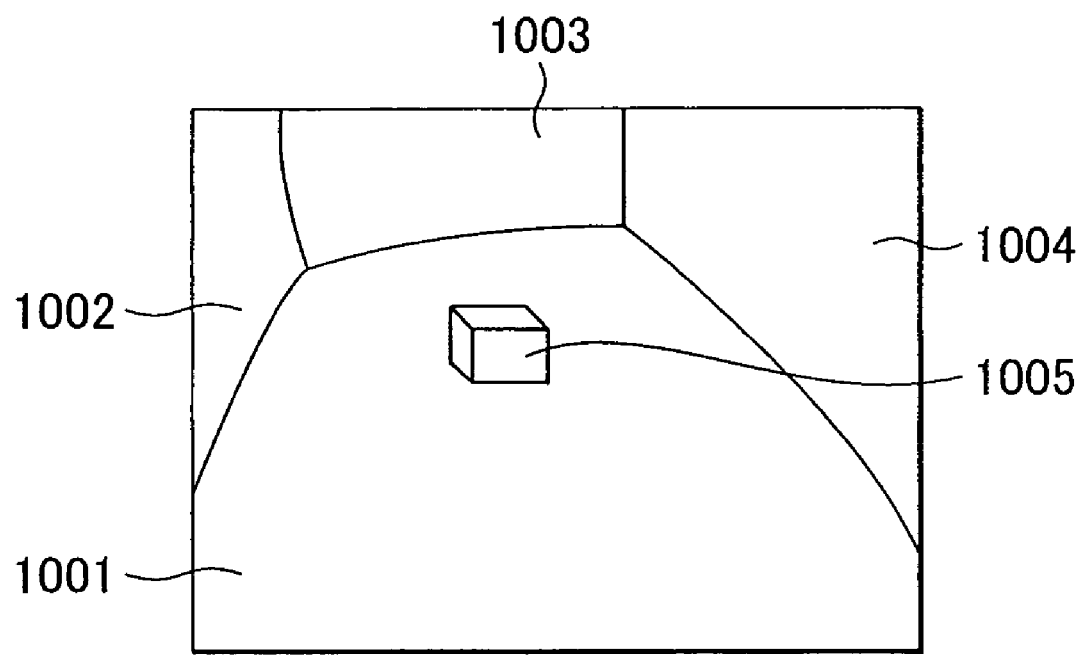
FIGS. 9A, 9B are oblique overhead views, each of which is acquired by the camera.
Figure 9B:
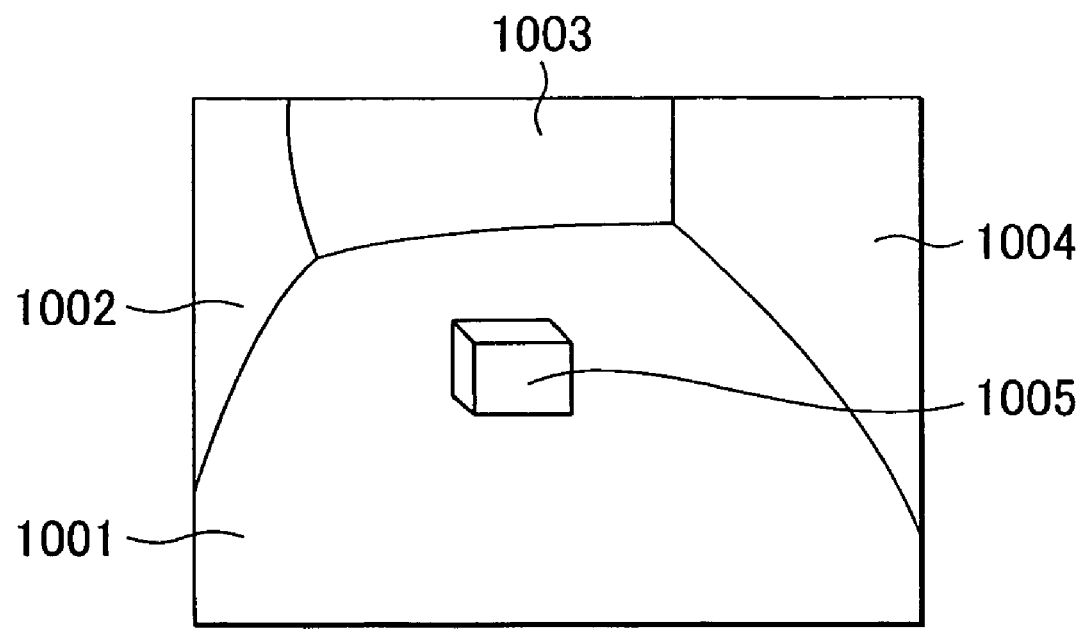
Figure 10A:
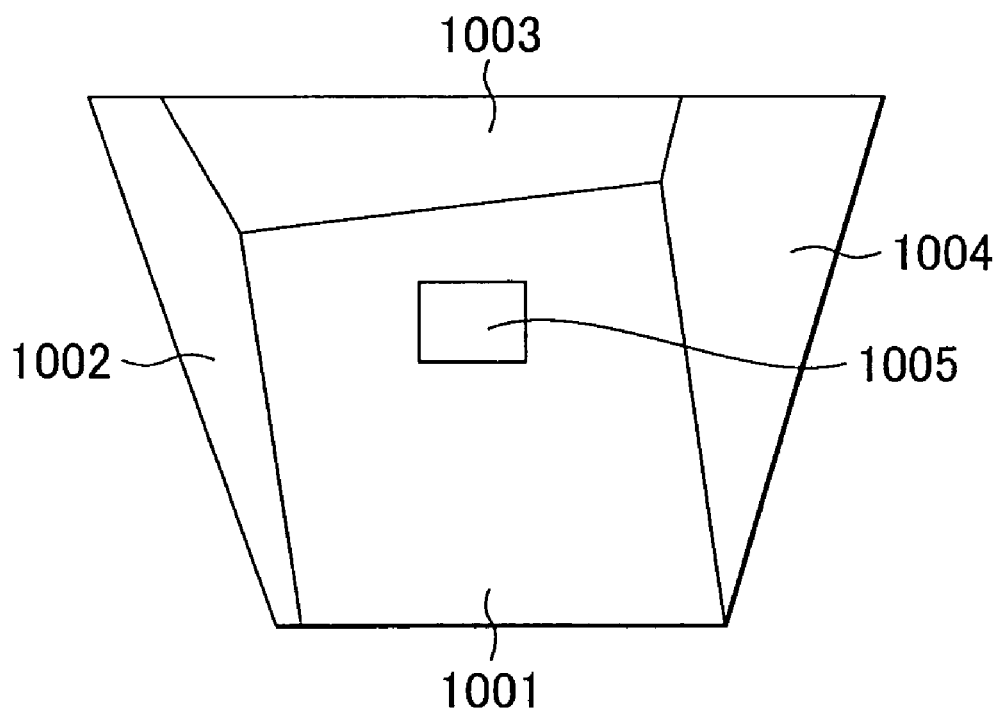
FIGS. 10A, 10B are top views, each of which is generated by lens distortion correction and projective transformation.
Figure 10B:
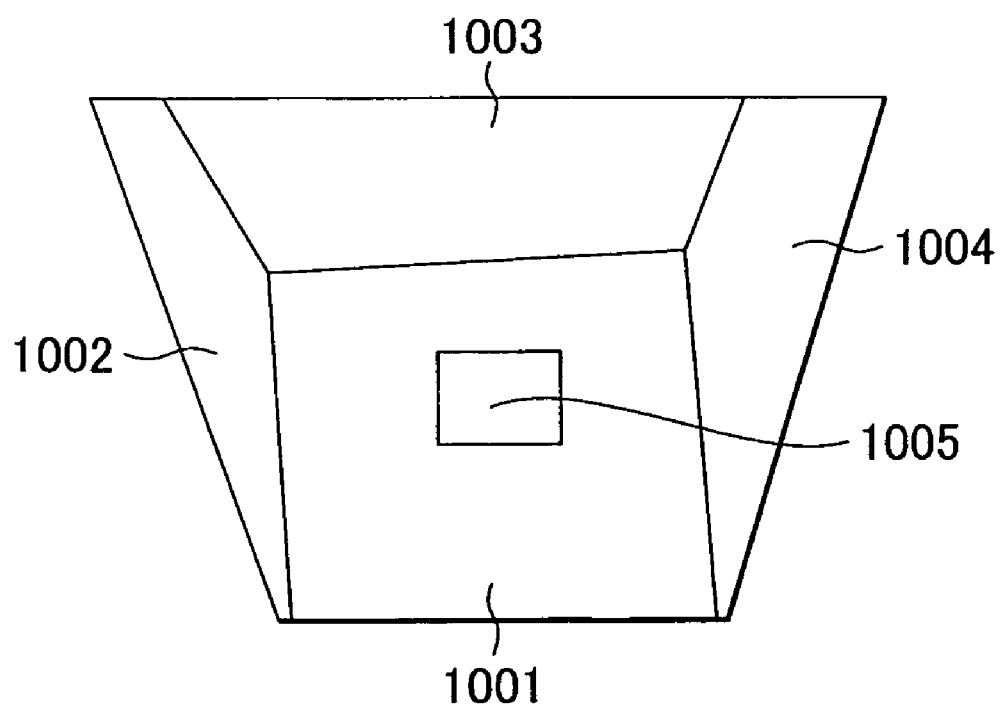

Next, the projective transformation is performed for images shown in FIGS. 9A, 9B to create top views. As a result of this processing, images as shown in FIGS. 10A, 10B are acquired.

Figure 11A:
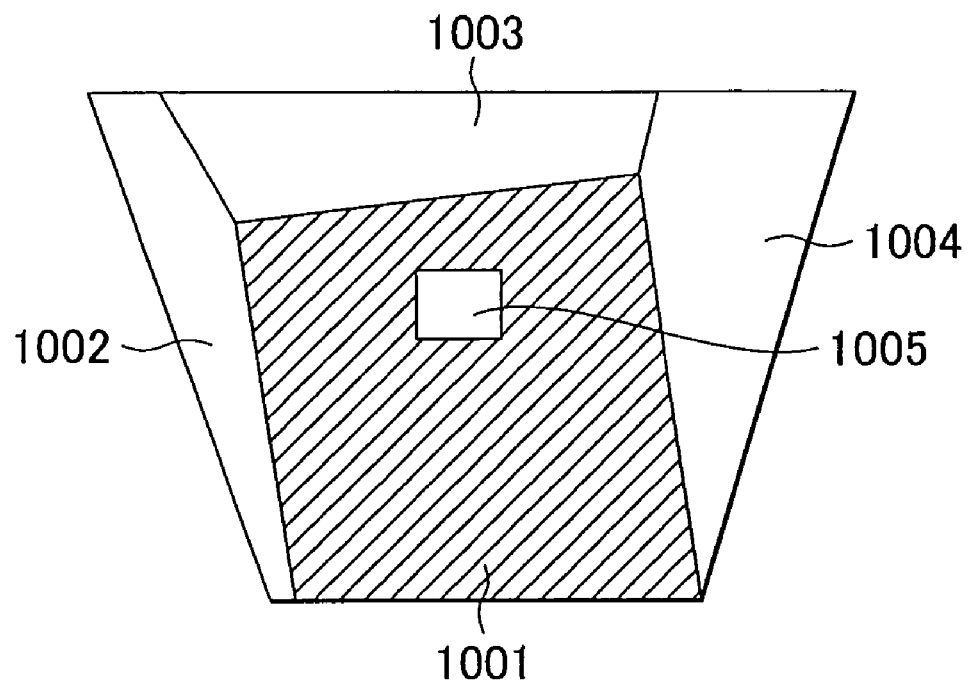
FIGS. 11A, 11B are top views, each of which is subjected to filling processing.
Figure 11B:
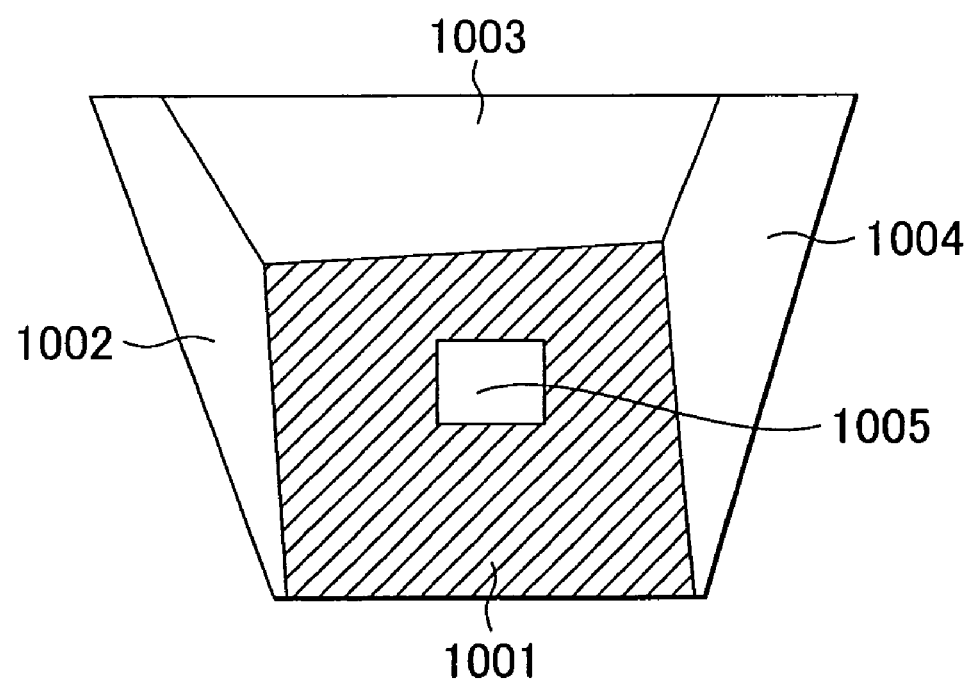

Subsequently, an edge image is generated from the image of the top view, and then an inside area surrounded by the edge is filled with some pattern by use of the seed fill algorithm. The seed fill algorithm is a general paint routine that fills a closed area including a pixel corresponding to a start point with some pattern. FIGS. 11A, 11B illustrate images in a state in which filling is completed.

Lastly, pattern matching which is shaped like a filled area (hatching part) is performed as shown in FIGS. 11A, 11B, and thereby each position of one image is associated with each corresponding position of the other image. Incidentally, the association of the positional relationship may also be carried out on the basis of extracted edges, each of which surrounds the filled area.

Incidentally, in this embodiment, if a position of a start point of the seed fill algorithm exists on an obstacle 1005, the obstacle is filled with a hatching pattern. Therefore, it is necessary to assign the position of the start point not to the three-dimensional object but to the road surface. Therefore, the position of the start point is assigned to a portion of the screen, which is as forward as possible, and in which there is a high possibility of the road surface. It is desirable that the position of the start point be assigned to an area that is included at least in the lower half of the imaging screen.

However, if the road surface has no pattern and the area thereof is sufficiently large, no closed area is found, and accordingly the pattern matching cannot also be performed. Therefore, it is necessary to judge whether or not a closed area is formed. The judgment as to whether or not a closed area is formed is made by checking whether or not each pixel in the leftmost line of the screen, and each pixel in the rightmost line of the screen, are filled by the seed fill algorithm.

In addition, in the case of a gravel-surfaced parking space, which is not paved, no white line is drawn. In such a case, it is possible to use a gravel texture as a template. In the case of gravel, a pattern thereof is coarse in compared with a road surface paved with asphalt or concrete. Accordingly, the gravel pattern is suitable for the use as a texture. However, if the pattern is too fine, template matching often results in misidentification. Therefore, such a pattern is not used as a texture. A judgment as to whether or not a pattern is too fine is made by smoothing a pattern image to generate a blurred image, and then by calculating a variance value of the brightness of the image. If the pattern is fine, the pattern is broken in the smoothing stage, and consequently the variance of the brightness becomes small. Accordingly, it is possible to make the judgment by the amount of variance. Moreover, since the size is constant, besides the generalized Hough transform, a method using a normalized correlation coefficient is also effective as a template matching technique used here.

Besides the above, tire stops are also located at positions that are relatively close to the road surface, and two tire stops are usually used as a set. Accordingly, as is the case with the white lines, the tire stops are easy to use as a template.

In the embodiment described above, an imaged image is subjected to the projective transformation to transform the image into a top view; and then a plurality of images are compared with one another by use of a landmark on the road surface. However, for example, in the case of a semisubterranean parking space, which is build into a foundation of a residence, and the back part of which is a wall, the projective transformation is performed to transform each image into not a top view, but a figure in the lateral direction, which is viewed from a direction parallel to the road surface. Then, a plurality of pieces of image data are aligned with one another on the basis of a pattern located on the back wall and an outline of the wall. This method can also be adopted. As a result, even in a place in which it is difficult align a plurality of images with one another by use of top views because there is no landmark on the road surface, it becomes possible to perform the positional alignment by use of a surrounding wall as a landmark so as to identify a three-dimensional object.

Figure 12:
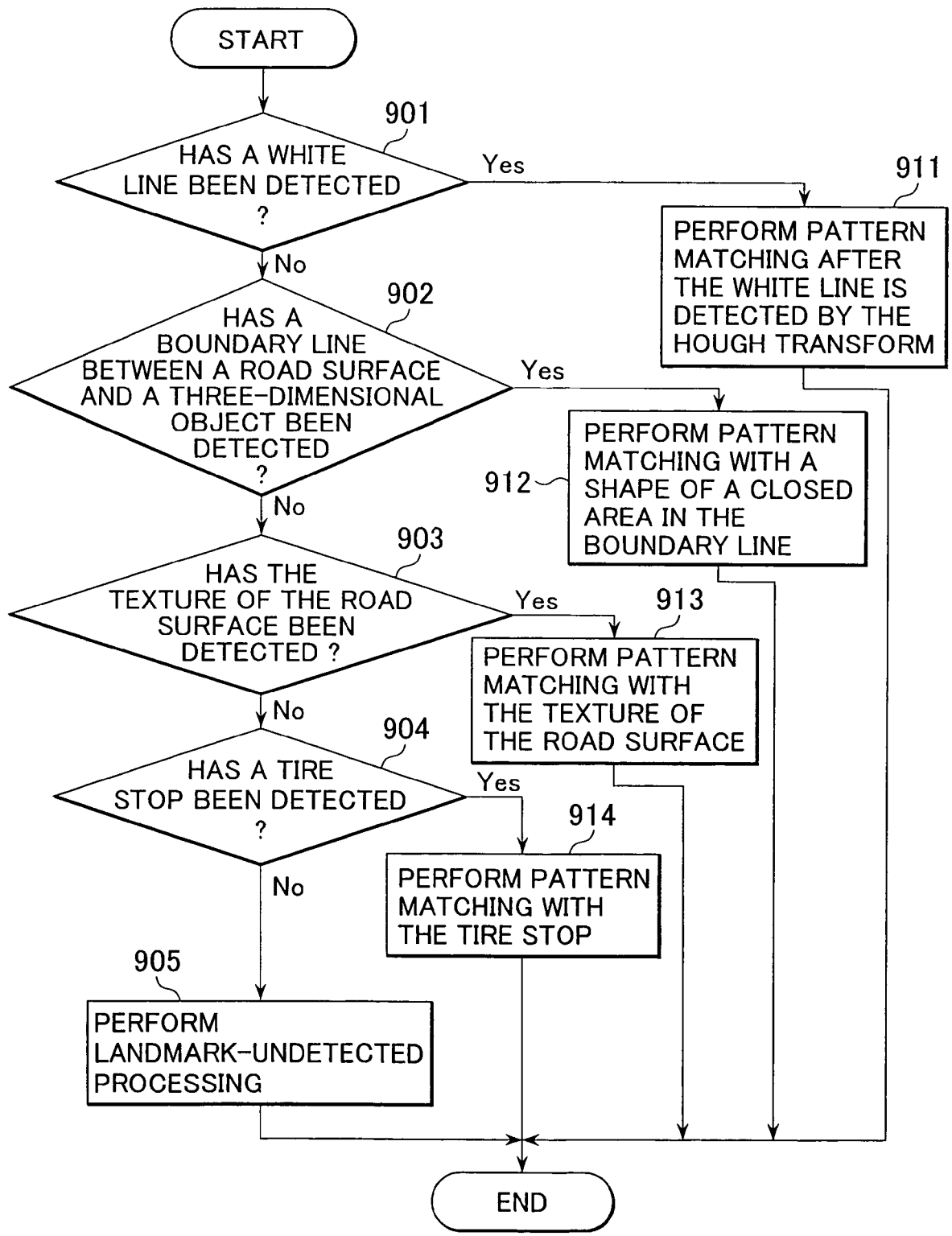
FIG. 12 is a process flowchart illustrating how to select and detect a landmark.

It is to be noted that the above-described embodiments can also be used in combination. As shown in FIG. 12, even if a white line could not be found out, the obstacle detection is tried wherever practicable by use of a boundary line between the road surface and a wall and a texture of the road surface.

To be more specific, in a step 901, detection of a white line is performed. If a white line is detected, the positional alignment is performed by use of the white line. If a white line has not been detected, the process proceeds to a step 902, where a boundary line between the road surface and a three-dimensional object (for example, a wall surface) is detected. On the other hand, if a white line has been detected, a plurality of images are aligned with one another (pattern matching) by use of the boundary line in question. If the detection results in failure even in the step 902, the process proceeds to a step 903, where a texture of the road surface is detected. If a texture of the road surface has been detected, the positional alignment is performed on the basis of the texture. If the positional alignment cannot be performed even in the step 903, the process proceeds to a step 904, where a tire stop is detected. If a tire stop has been detected, the positional alignment is performed on the basis of the tire stop. Incidentally, although not illustrated in this embodiment, it may also be so configured that the positional alignment is further tried by use of the above-described figure in the lateral direction. If the pattern matching cannot be achieved by the processing described in the steps 901 through 904, landmark-undetected processing is performed. To be more specific, a driver is notified through the image display unit 203 and the audio output unit 204 that the obstacle detection cannot be performed.

According to this configuration, it is possible to successively try the detection in order from a landmark of the parking space with a high degree of certainty, and thereby to decrease the probability that the obstacle detection will eventually become impossible.

Here, as a case where no landmark is detected, it is thought that there is a case where a landmark temporarily disappears. In such a case, when a landmark cannot be detected once in the processing performed at a specific point of time, if the landmark-undetected processing is immediately performed, it becomes practically difficult to carry out the obstacle detection. For example, even if a sunbeam momentarily enters into an area of the imaging element that is imaging a white line, which causes a smear, the obstacle detection function will be stopped.

For this reason, it is so configured that in a step 905, processing of counting the number of times a landmark is not detected is provided, and if a landmark is not detected the given number of times in succession, the landmark-undetected processing is performed. This configuration makes it possible to perform the obstacle detection even if a landmark temporarily disappears. Incidentally, the specified count value is set on the basis of an imaging period of the camera 201 so that after the landmark-undetected processing, a driver can have enough time to cope with the processing. For example, it is thought that the count value is changed on the basis of the speed of the vehicle and the mounting angle of the camera (the distance from the host vehicle to an imaged area). To be more specific, if the mounting angle of the camera 201 is small (the camera faces more perpendicularly to the road surface), an area to be imaged by the camera 201 nears the host vehicle as compared with a case where the mounting angle of the camera 201 is large. Therefore, the count value is decreased with the decrease in mounting angle. In addition, it is necessary to decrease the count value with the increase in speed of the vehicle. This is because it is necessary to have the sufficient braking time (the distance) in all of the above cases.

Moreover, it may also be so configured that a position of the host vehicle is identified using map information and GPS information so as to select the algorithm that is suitable for an environment in which the host vehicle exists. For example, in parking spaces in a city area, and in parking spaces of large-scale stores including a supermarket, there is a high possibility that white lines, curbs, and car stops exist. Accordingly, higher priority may be given to the positional alignment by means of the Hough transform. In contrast with this, in parking spaces where there is a low possibility that white lines are drawn, such as a suburban parking space and a parking space in a riverbed, higher priority may be given to the positional alignment that uses the road surface texture. Furthermore, in parking spaces of stand-alone houses, or the like, it is thought that the parking spaces are surrounded by walls. Therefore, higher priority may also be given to the seed fill algorithm or the method in which each image is transformed into a figure viewed from the lateral direction.

What is claimed is:

1. An obstacle detection system comprising:
    an imaging unit for imaging the outside of a vehicle; and
    a processing unit for processing an image acquired from the imaging unit;
    wherein said processing unit executes the steps of:
      imaging a first image including a road surface image;
      imaging a second image including the road surface image at a timing different from the timing when the first image is imaged;
      creating top views of the first and second images;
      detecting a characteristic shape on the road surface from the two top views;
      aligning the two top views with each other on the basis of the detected characteristic shape;
      comparing overlapped portions of the two top views with each other; and
      judging an area in which a difference occurs to be an area including an obstacle.

2. An obstacle detection system comprising:
    a camera for imaging the outside of a vehicle, said camera being mounted to the vehicle;
    a processing unit for creating a top view of a first image including a road surface image, which is imaged by the camera, creating a top view of a second image which is imaged at a timing different from the timing when the first image is imaged, associating the two top views with each other on the basis of a characteristic shape on the road surface, and identifying as an obstacle an area in each overlapped portion of the two top views in which a difference occurs; and
    an audio output unit for outputting sound if the distance between the obstacle and the vehicle is a specified value or less.

3. The obstacle detection system according to one of claim 1 or 2, wherein
    the characteristic shape on the road surface is a pattern that is painted on the road surface.

4. The obstacle detection system according to one of claim 1 or 2, wherein
    the characteristic shape on the road surface is a line that is defined by a portion of the road surface, the portion being in contact with a three-dimensional object.

5. The obstacle detection system according to one of claim 1 or 2, wherein
    the characteristic shape on the road surface is a road surface texture.

6. The obstacle detection system according to one of claim 1 or 2, wherein
    the characteristic shape on the road surface is a tire stop.

7. The obstacle detection system according to one of claim 1 or 2, further comprising an image display unit for displaying an image, wherein
    if said processing unit cannot detect a characteristic shape on the road surface, said image display unit displays the information that said processing unit cannot detect the characteristic shape on the road surface.

8. The obstacle detection system according to claim 7, wherein
    said image display unit displays the information that said processing unit cannot detect a characteristic shape on the road surface, with the information being superimposed on the imaged image or the top view.

9. The obstacle detection system according to one of claim 1 or 2, further comprising an indicator for indicating that the processing unit cannot detect a characteristic shape on the road surface.

10. The obstacle detection system according to one of claim 1 or 2, wherein
    if said processing unit cannot detect a characteristic shape on the road surface, sound is output.

11. The obstacle detection system according to one of claim 1 or 2, further comprising an image display unit for displaying an image, wherein
    among the areas in which a difference occurs, an area which is the closest to the vehicle is highlighted on said image display unit.

12. The obstacle detection system according to one of claim 1 or 2, wherein
    sound is output in response to an area which is the closest to the vehicle among the areas in which a difference occurs.

13. The obstacle detection system according to one of claim 1 or 2, further comprising a brake control unit for controlling a braking force of the vehicle, wherein
    said processing unit outputs an instruction to said brake control unit in response to an area which is the closest to the vehicle among the areas in which a difference occurs.

14. An obstacle detection method that uses a camera, the obstacle detection method comprising the steps of:
    imaging a first image including a road surface image;
    imaging a second image including the road surface image at a timing different from the timing when the first image is imaged;
    creating top views of the first and second images;
    detecting a characteristic shape on the road surface from the two top views;
    aligning the two top views with each other on the basis of the detected characteristic shape;
    comparing overlapped portions of the two top views with each other; and
    judging an area in which a difference occurs to be an area including an obstacle.

* * * * *